(12) United States Patent
Yan et al.

(10) Patent No.: US 10,848,066 B1
(45) Date of Patent: Nov. 24, 2020

(54) CONTROLLER FOR A DC/DC CONVERTER

(71) Applicant: Hong Kong Applied Science and Technology Research Institute Co., Ltd., Shatin (HK)

(72) Inventors: Wai To Yan, Tai Po (HK); Kuen Fuat Yuen, Sheung Shui (HK); Sui Pung Cheung, Kowloon (HK); Tin Ho Li, Kowloon Bay (HK)

(73) Assignee: Hong Kong Applied Science and Technology Research Institute Company Limited, Kowloon (HK)

( * ) Notice: Subject to any disclaimer, the term of this patent is extended or adjusted under 35 U.S.C. 154(b) by 0 days.

(21) Appl. No.: 16/684,824

(22) Filed: Nov. 15, 2019

(51) Int. Cl.
*H02M 3/158* (2006.01)
*H02M 1/096* (2006.01)
*H02M 1/00* (2006.01)

(52) U.S. Cl.
CPC ......... *H02M 3/1584* (2013.01); *H02M 1/096* (2013.01); *H02M 2001/009* (2013.01); *H02M 2003/1586* (2013.01)

(58) Field of Classification Search
CPC .. H02M 3/1582; H02M 3/1584; H02M 3/285; H02M 3/33561; H02M 7/49
See application file for complete search history.

(56) References Cited

U.S. PATENT DOCUMENTS

| | | | |
|---|---|---|---|
| 6,052,298 | A | 4/2000 | Wallace et al. |
| 6,696,825 | B2 | 2/2004 | Harris et al. |
| 7,239,257 | B1 | 7/2007 | Alexander et al. |

(Continued)

FOREIGN PATENT DOCUMENTS

| | | |
|---|---|---|
| CN | 1448819 A | 10/2003 |
| CN | 104638895 A | 5/2015 |

(Continued)

OTHER PUBLICATIONS

International Search Report, PCT/CN2019/119123, dated Jul. 29, 2020.

(Continued)

*Primary Examiner* — Adolf D Berhane
*Assistant Examiner* — Afework S Demisse

(57) ABSTRACT

Described is a controller for a DC/DC converter of a type having N power stages, where N is a natural number greater or equal to 2. The controller comprises a decision maker module, a proportional-integral-derivative (PID) or proportional-integral (PI) control module and a transient compression control module. The decision maker module determines a first steady state mode of operation and a second transient mode of operation and is configured to switch control between said first steady state mode of operation to said second transient mode of operation when an operating parameter of one of the N power stages exhibits a predetermined operating condition relative to a predetermined operating limit and/or a predetermined, calculated or selected threshold. The PID or PI module regulates the operating parameter during said first steady state mode of operation. The transient compression control module limits any overshoot, undershoot or imbalances of the operating parameter levels during said second transient mode of operation.

21 Claims, 12 Drawing Sheets

(56) References Cited

U.S. PATENT DOCUMENTS

| | | | | |
|---|---|---|---|---|
| 8,232,786 B2* | 7/2012 | Phadke | ................ | H02M 3/157 |
| | | | | 323/283 |
| 8,274,265 B1* | 9/2012 | Khanna | ............... | H02M 3/1584 |
| | | | | 323/225 |
| 2017/0060154 A1* | 3/2017 | Ozawa | ................ | H02M 3/158 |

FOREIGN PATENT DOCUMENTS

| | | |
|---|---|---|
| CN | 105186883 A | 12/2015 |
| CN | 107947588 A1 | 4/2018 |

OTHER PUBLICATIONS

Control Strategy for Input-Series-Output-Parallel Converters; Chan & Tse, IEEE Transactions,; May 2009.
Control Technique for Series Input-Parallel Output Converter Topologies: Kimball, Mossoba, & Krein; Missouri Univ. of Science and Technology; Jun. 1, 2005.

* cited by examiner

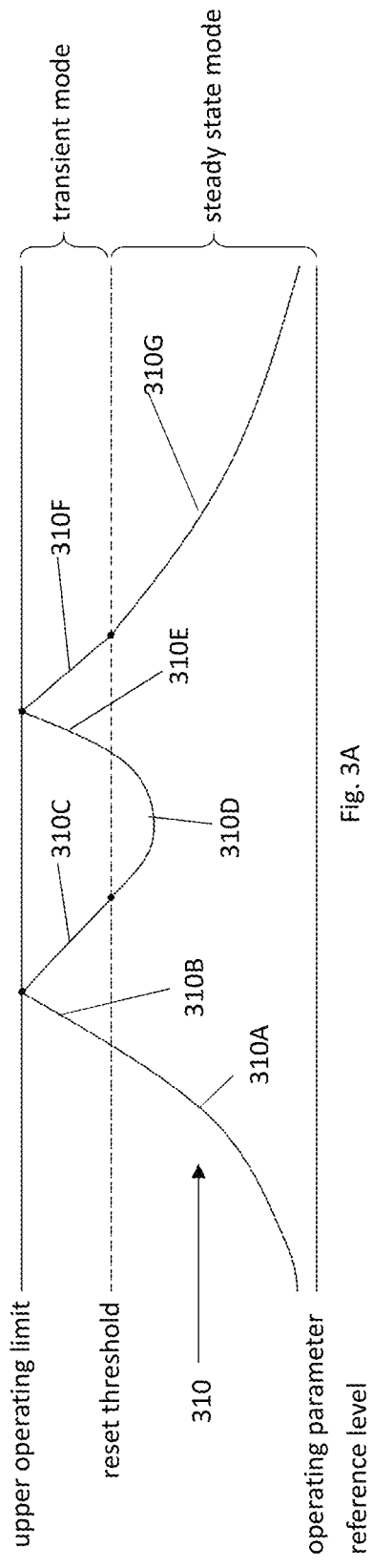
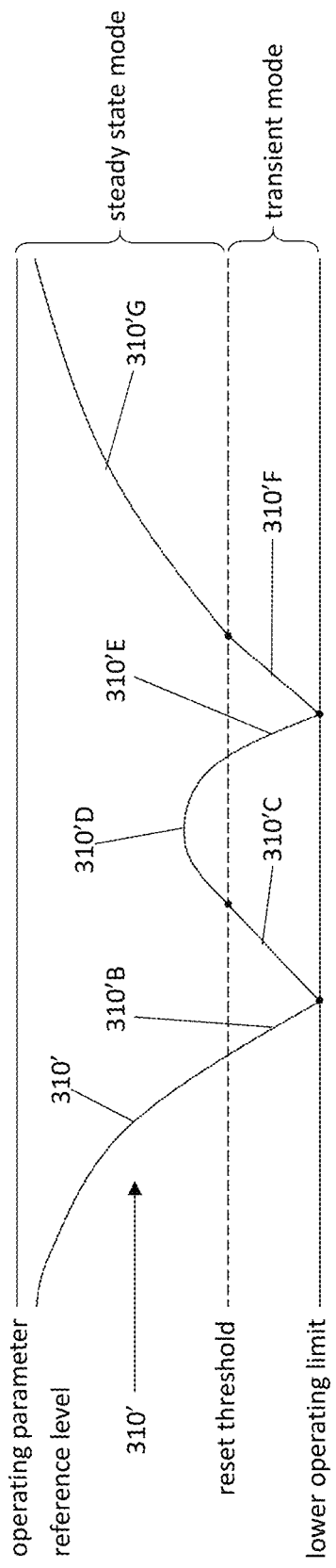
Fig. 3A
Fig. 3B

CONTROLLER FOR A DC/DC CONVERTER

FIELD OF THE INVENTION

The invention relates generally to a controller for a DC/DC converter, to a DC/DC converter including such a controller, and to a method of controlling a DC/DC converter.

BACKGROUND OF THE INVENTION

A DC-to-DC (DC/DC) converter typically comprises an electronic circuit or electromechanical device which converts a source of direct current (DC) from one operating parameter level to another operating parameter level. Normally, the operating parameter is voltage, but the operating parameter levels can be from one voltage level to another voltage level, from one current level to another current level, or from a voltage level to a current level and vice-versa.

DC/DC converters, especially DC/DC power converters, are typically utilized to convert power from an input power source to a load. In some technology fields such as traction engines and power transmission systems, there is a demand for low cost, high power density and high efficiency power converters.

DC/DC converters are, however, prone to operating parameter transient overshoots and undershoots and to transient imbalances in levels of the operating parameter(s) between the power stages of the DC/DC converter, especially during load changes. It can be difficult to recover a balance between the power stages in the face of such transient imbalances during load changes. Typically, control circuits utilizing high-rated components such as, for example, electrolytic capacitors (e-caps) or metal oxide semiconductor field effect transistors (MOSFETs) are required to process the transient overshoots, undershoots and imbalances of the operating parameter levels to prevent damage to the DC/DC converter. Not only do overshoots, undershoots and imbalances of the operating parameter levels compromise performance of the DC/DC converter, they also compromise the ability to design a low cost and reliable DC/DC converter, especially a low cost and reliable DC/DC power converter. This is because the components of the control circuit necessary for processing the overshoots, undershoots and imbalances of the operating parameter levels and/or the components of the DC/DC converter itself must be selected such that they are rated sufficiently highly enough to cope with any peaks in the operating parameter. One consequence of this is that many, if not all, of the components of the control circuit and/or the components of the DC/DC converter must be rated considerably higher than is necessary for normal steady state operation with the result that the DC/DC converter is larger in size and considerably more expensive than it need be.

CN107947588 discloses an input-series-output-parallel (ISOP) DC/DC converter having natural voltage sharing characteristic. The system comprises n sub-modules, wherein each sub-module comprises a Boost converter and an LLC resonant converter, where n is a natural number larger than or equal to 2. The Boost converter comprises a front stage, the LLC resonant converter comprises a rear stage, and an output of the Boost converter is used as an input of the LLC resonant converter. The converters are connected by an intermediate bus capacitor with input ends of the Boost converters of the n sub-modules being sequentially connected in series. A positive electrode of an input voltage source is connected with an input positive end of a first Boost converter. A negative electrode of the input voltage source is connected with an input negative end of an n(th) Boost converter. Output ends of the LLC resonant converters of the n sub-modules are connected in parallel and are respectively connected with a positive end and a negative end of an output resistor. Input voltage sharing and output current sharing of the ISOP system can be achieved. This reference does not, however, disclose any means of quickly limiting operating parameter transient overshoots and undershoots.

U.S. Pat. No. 6,696,825 discloses a DC-to-DC converter having a pulse width modulation (PWM) circuit cooperating with at least one power switch for supplying power from a source to a load over a range between a lower limit and an upper limit to thereby control an output voltage for the load. The converter may also include a primary feedback control loop cooperating with the PWM circuit for supplying power to the load between the lower and upper limits based upon the output voltage during normal load transient conditions. The converter may also include at least one override feedback control loop cooperating with the PWM circuit for overriding the primary feedback control loop and supplying power to the load at one of the lower and upper limits based upon the output voltage during a corresponding relatively fast load transient condition. However, the override feedback loop operates at best at about one tenth of the switching frequency of the PWM circuit with a relatively long settling time for at least operating parameter overshoots.

U.S. Pat. No. 8,232,786 discloses a method of controlling a power converter having at least one switching device for supplying an output voltage and a load current to a load. The method includes sensing the output voltage and sensing the load current. The method further includes controlling a duty cycle of the switching device according to the sensed output voltage and a voltage control loop when a rate of change of the load current does not exceed a threshold level. The method also includes adjusting the duty cycle of the switching device set by the voltage control loop when the rate of change of the load current exceeds the threshold level. This reference does not, however, disclose any means of quickly limiting operating parameter transient overshoots and undershoots.

What is desired is a means and a method of limiting operating parameter transient overshoots and/or undershoots in a DC/DC converter and/or limiting transient imbalances in levels of the operating parameter between the N power stages in a DC/DC converter.

OBJECTS OF THE INVENTION

An object of the invention is to mitigate or obviate to some degree one or more problems associated with known methods of controlling a DC/DC converter.

The above object is met by the combination of features of the main claims; the sub-claims disclose further advantageous embodiments of the invention.

Another object of the invention is to provide a means and a method of limiting operating parameter transient overshoots and/or undershoots in a DC/DC converter.

Another object of the invention is to provide a means and a method of limiting transient imbalances in levels of the operating parameter between the N power stages in a DC/DC converter.

A further object of the invention is to enable the design of reduced size and/or cost DC/DC converters for a given operating capacity.

One skilled in the art will derive from the following description other objects of the invention. Therefore, the foregoing statements of object are not exhaustive and serve merely to illustrate some of the many objects of the present invention.

SUMMARY OF THE INVENTION

The invention concerns a controller for a DC/DC converter of a type having N power stages, where N is a natural number greater or equal to 2. The controller comprises a decision maker module, a proportional-integral-derivative (PID) control module or a proportional-integral (PI) control module and a transient compression control module. The decision maker module determines a first steady state mode of operation and a second transient mode of operation and is configured to switch control between said first steady state mode of operation and said second transient mode of operation in response to an operating parameter of one of the N power stages exhibiting a predetermined operating condition relative to a predetermined operating limit and/or a predetermined, calculated or selected threshold. The PID module or PI module regulates the operating parameter during said first steady state mode of operation. The transient compression control module limits any overshoot or undershoot of the operating parameter during said second transient mode of operation. Additionally, or alternatively, the transient compression control module limits transient imbalances in levels of the operating parameter between the N power stages in the DC/DC converter.

In a first main aspect, the invention provides a controller for a DC/DC converter of a type having N power stages, where N is a natural number greater or equal to 2. The controller comprises, for at least one of the N power stages, a decision maker module and a transient compression control module. The decision maker module is configured to determine a first steady state mode of operation and a second transient mode of operation for said at least one of the N power stages, said decision maker module being configured to switch control from said first steady state mode of operation to said second transient mode of operation when an operating parameter of said at least one of the N power stages exhibits a predetermined operating condition relative to a predetermined operating limit and/or a predetermined, calculated or selected threshold. The transient compression control module is configured to provide one or more change control parameters to cause said operating parameter of said at least one of the N power stages to pass back over said predetermined, calculated or selected threshold. The transient compression control module is preferably configured to be triggered when or soon after the decision maker module switches control from said first steady state mode of operation to said second transient mode of operation.

The foregoing arrangement of the controller enables the decision maker module and/or the transient compression control module to operate at or near the switching frequency of the controller.

In a second main aspect, the invention provides a method of controlling a DC/DC converter of a type having N power stages, where N is a natural number greater or equal to 2. The method comprises the steps of: for at least one of the N power stages of the DC/DC converter: determining a first steady state mode of operation and a second transient mode of operation; switching control from said first steady state mode of operation to said second transient mode of operation when an operating parameter of said at least one of the N power stages exhibits a predetermined operating condition relative to a predetermined operating limit and/or a predetermined, calculated or selected threshold; and providing one or more change control parameters to cause said operating parameter of said at least one of the N power stages to pass back over said predetermined, calculated or selected threshold.

In a third main aspect, the invention provides a DC/DC converter comprising: N power stages, where N is a natural number greater or equal to 2; and a controller. The controller comprises: a decision maker module for determining a first steady state mode of operation and a second transient mode of operation for said at least one of the N power stages, said decision maker module being configured to switch control from said first steady state mode of operation to said second transient mode of operation when an operating parameter of said at least one of the N power stages exhibits a predetermined operating condition relative to a predetermined operating limit and/or a predetermined, calculated or selected threshold; and a transient compression control module configured to provide one or more change control parameters to cause said operating parameter of said at least one of the N power stages to pass back over said predetermined, calculated or selected threshold.

In a fourth main aspect, the invention provides a controller for a DC/DC converter of a type having N power stages, where N is a natural number greater or equal to 2, the controller comprising: a decision maker module for determining a first steady state mode of operation and a second transient mode of operation, said decision maker module being configured to switch control from said first steady state mode of operation to said second transient mode of operation when an operating parameter of one of the N power stages exhibits a predetermined operating condition relative to a predetermined operating limit and/or a predetermined, calculated or selected threshold; a proportional-integral-derivative (PID) control module or a proportional-integral (PI) control module for regulating the operating parameter during said first steady state mode of operation; and a transient compression control module for limiting any overshoot or undershoot of the operating parameter during said second transient mode of operation.

In a fifth main aspect, the invention provides a controller for a DC/DC converter of a type having N power stages, where N is a natural number greater or equal to 2, the controller comprising: a decision maker module for determining a first steady state mode of operation and a second transient mode of operation, said decision maker module being configured to switch control from said first steady state mode of operation to said second transient mode of operation when an operating parameter of one of the N power stages exhibits a predetermined operating condition relative to a predetermined operating limit and/or a predetermined, calculated or selected threshold; a proportional-integral-derivative (PID) control module or a proportional-integral (PI) control module for regulating the operating parameter during said first steady state mode of operation; and a transient compression control module for limiting imbalances in levels of the operating parameter between the N power stages during said second transient mode of operation.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood.

Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which:

FIG. 3A is a signal diagram illustrating changes in an operating parameter of a power stage of a DC/DC converter in an upper operating band of said power stage in accordance with the invention;

FIG. 3B is a signal diagram illustrating changes in an operating parameter of a power stage of a DC/DC converter in a lower operating band of said power stage in accordance with the invention;

DESCRIPTION OF PREFERRED EMBODIMENTS

Figure 1:
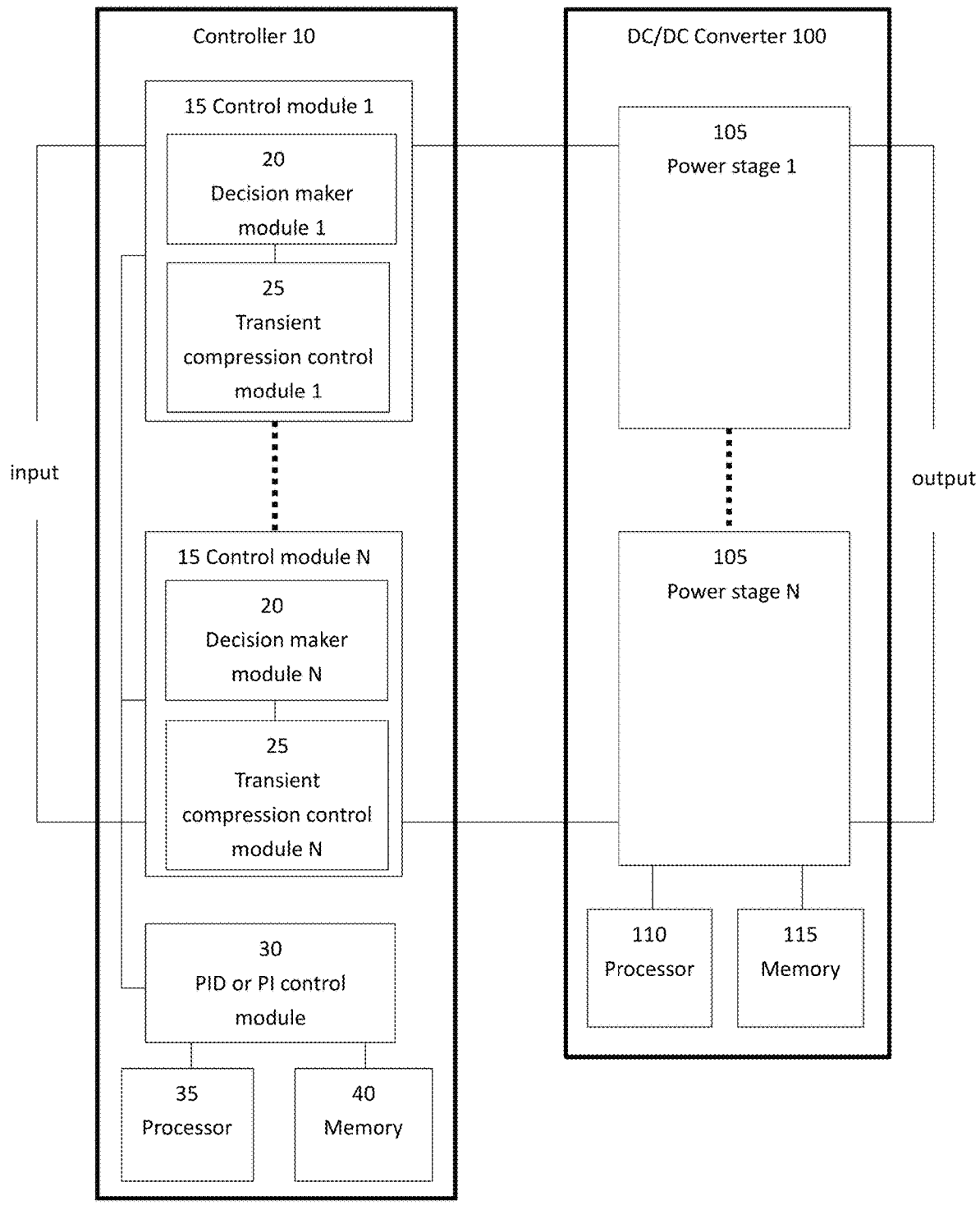
FIG. 1 is a schematic block diagram of a controller and a DC/DC converter including such a controller in accordance with the invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

A known controller for a DC/DC converter comprises a PID controller. A PID controller uses three control functions comprising proportional, integral and derivative control terms to apply accurate control during steady state operation of the DC/DC converter. The PID controller continuously calculates an error value between a desired operating parameter reference level and a measured operating parameter level and applies a correction based on the proportional, integral and derivative control terms. The PID controller attempts to minimize the error over time by adjusting a control variable or parameter to a new value determined by a weighted sum of the proportional, integral and derivative control terms.

In the following description of embodiments of the present invention, reference will be made to a PID controller or a PI controller for controlling at least a steady state operation of the DC/DC converter. However, a person skilled in the art will understand that any suitable controller can be employed for controlling a steady state operation of the DC/DC converter in the embodiments of the invention as the invention generally comprises adding to any such suitable controller novel control means configured to limit operating parameter transient overshoots and/or undershoots in the DC/DC converter and/or limit transient imbalances in levels of the operating parameter between the N power stages in the DC/DC converter. The novel control means in accordance with the invention may be implemented as any one or any combination of hardware, firmware and software as will be more fully described hereinbelow.

FIG. 1 is a schematic block diagram of a controller 10, and a DC/DC converter 100 including such a controller 10, in accordance with the invention. The DC/DC converter 100 is of a type having N power stages 105 denoted as "1" to "N", where N is a natural number greater or equal to 2. The DC/DC converter 100 is preferably of a type having a shared input voltage and a controlled output voltage. The DC/DC converter 100 may include a processor 110 and a memory 115, although these are not essential. Some functions of the DC/DC converter 100 may be implemented using logic circuits and/or executable code/machine readable instructions stored in the memory 115 for execution by the processor 110.

The controller 10 preferably comprises N control modules 15 denoted as "1" to "N", there preferably being a control module 15 for each of the N power stages 105 of the DC/DC converter 100. At least one, but preferably all, of the control modules 15 comprises a decision maker module 20 and a transient compression control module 25. The decision maker module 20 and the transient compression control module 25 together comprise the novel additional control means in accordance with the invention. Other than the added novel control means, the controller 10 may comprise any conventional DC/DC converter controller such as, for example, a PID controller or a PI controller.

In this embodiment, the controller 10 is also provided with a PID control module or a PI control module 30. The PID module or the PI control module 30 may comprise a single PID module or a single PI module 30. The PID module or the PI control module 30 is configured to regulate the operating parameter of one or more of the N power stages during a first steady state mode of operation. In this respect, the PID module or the PI control module 30 operates in a manner consistent with many known prior art controllers for DC/DC converters. In contrast to prior art controllers, however, the decision maker module 20 is configured to determine the first steady state mode of operation and a second transient mode of operation for its respective power stage 105 and to switch control between said first steady state mode of operation and said second transient mode of operation in response to the operating parameter of said respective power stage 105 exhibiting a predetermined operating condition relative to a predetermined operating limit and/or a predetermined, calculated or selected threshold. Furthermore, the respective transient compression control modules 25 limit any overshoot or undershoot of the operating parameter during said second transient mode of operation for their respective power stages 105 and/or limit transient imbalances in levels of the operating parameter between said N power stages in the DC/DC converter as will be more fully described hereinbelow.

In one embodiment, the controller 10 may comprise a plurality of functional blocks for performing various functions thereof. For example, the controller 10 includes the N control modules 15, the PID control module or the PI control module 30, one or more processors 35 and one or more memories 40. The controller 10 may therefore be implemented using logic circuits and/or executable code/machine readable instructions stored in one or more of the memories 40 of the controller 10 for execution by one or more of the processors 35 to thereby perform functions as described herein. For example, the executable code/machine readable instructions may be stored in one or more memories 40 (e.g. random access memory (RAM), read only memory (ROM), flash memory, magnetic memory, optical memory or the like) suitable for storing one or more instruction sets (e.g. application software, firmware, operating system, applets, and/or the like), data (e.g. configuration parameters, operating parameters and/or thresholds, collected data, processed data, and/or the like), etc. The one or more memories 40 may comprise processor-readable memories for use with respect to one or more processors 35 operable to execute code segments of control modules 15. Additionally, or alternatively, the controller 10 may comprise one or more special purpose processors (e.g. application specific integrated circuit (ASIC), field programmable gate array (FPGA), graphics processing unit (GPU), and/or the like configured to perform functions of the controller 10 as described herein.

In another embodiment as will be described herein, the controller 10 may be implemented by an analog circuit which may include coding for digital control.

It will be understood therefore that the controller 10 may be implemented by any one or any combination of hardware, firmware and software.

Figure 2:
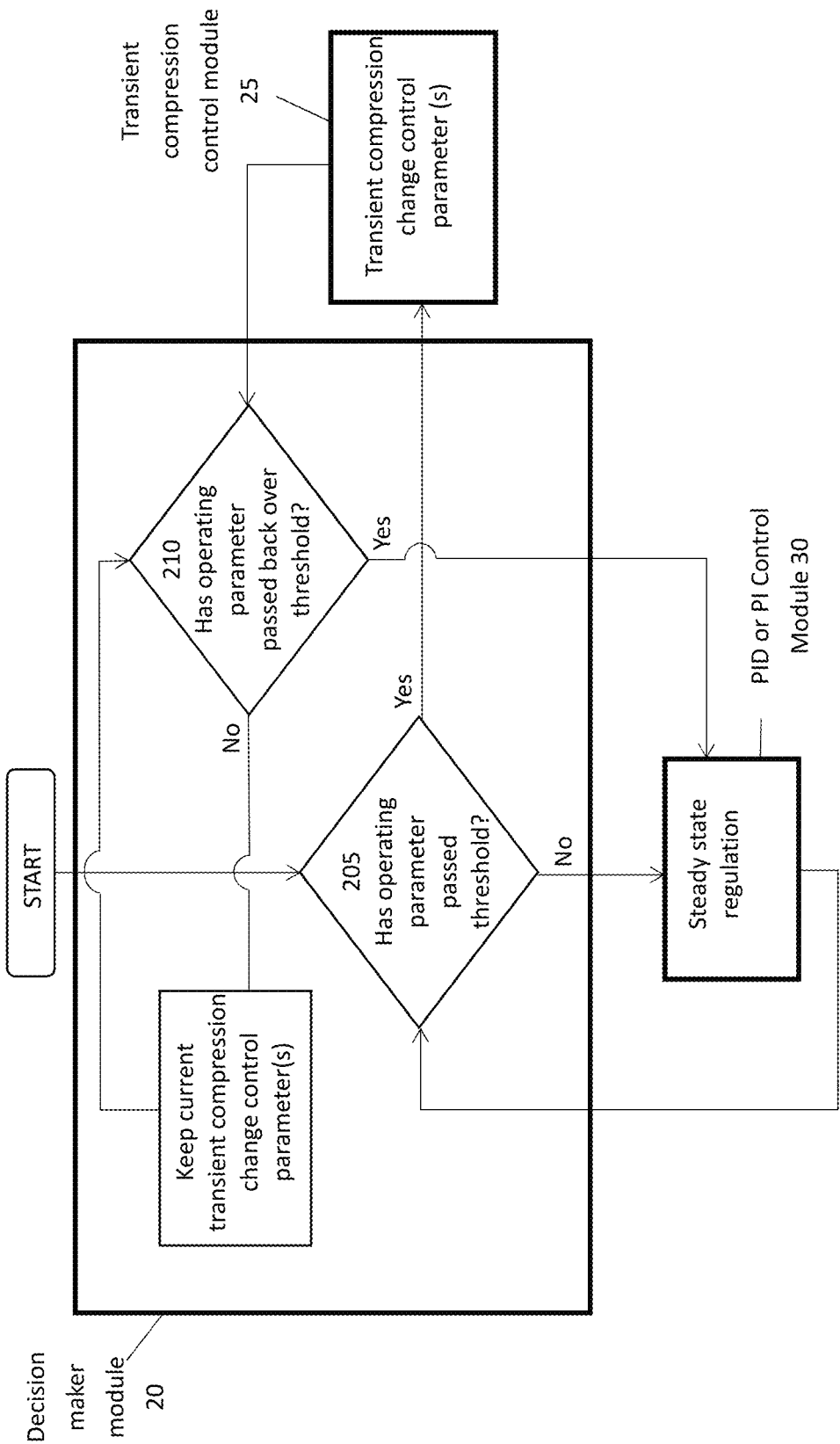
FIG. 2 is a flow diagram illustrating operation of the controller of FIG. 1 in accordance with a method of the invention.

Referring to FIG. 2, the operation of one of the control modules 15 comprising the novel control means according to the invention is illustrated. For the respective power stage 105 of the DC/DC converter 100 associated with said control module 15, the operating parameter may comprise any of said power stage's input voltage, output voltage, input current, and output current.

At a first decision box 205, the decision maker module 20 of said control module 15 compares a measured operating parameter level for said power stage 105 to an operating parameter threshold level. The operating parameter threshold level may comprise a desired, selected or calculated operating parameter threshold level. On determining at decision box 205 that the measured operating parameter level for said power stage 105 has not passed, e.g. risen above or fallen below, the threshold level depending on whether the power stage is operating in an upper band or a lower band with references to a predetermined, calculated or selected operating parameter reference level, the decision maker module 20 determines that the power stage 105 is operating in the first steady state mode of operation. Consequently, control of the operating parameter of the power stage 105 passes to, or remains with, the PID control module or the PI control module 30 which regulates the operating parameter during said first steady state mode of operation in a generally conventional manner. However, if at decision box 205, the decision maker module 20 determines that the measured operating parameter level for said power stage 105 exhibits a predetermined operating condition relative to a predetermined operating limit and/or the threshold level, the decision maker module 20 determines that the power stage 105 is operating in the second transient mode of operation. Consequently, the decision maker module 20 passes control of the operating parameter of the power stage 105 to the transient compression control module 25.

In the second transient mode of operation, the transient compression control module 25 generates one or more change control parameters to cause said measured operating parameter of the power stage 105 to pass back over said threshold, i.e. to fall below or rise above said threshold by way of returning said power stage to the first steady state mode of operation.

The transient compression control module 25 is preferably triggered when, or soon after, the decision maker module switches from said first steady state mode of operation to said second transient mode of operation. In some embodiments, the predetermined operating condition exhibited by the power stage 105 may comprise the measured operating parameter reaching or exceeding the operating limit of the power stage 105. In other embodiments, the predetermined operating condition exhibited by the power stage 105 may comprise the measured operating parameter reaching or exceeding the threshold.

Referring again to FIG. 2, whilst the transient compression control module 25 is generating one or more change control parameters, the decision maker module 20 makes a determination at decision box 210 as to whether or not the measured operating parameter has passed back over the threshold, i.e. has fallen below the threshold where the power stage 105 is operating in the upper band or risen above the threshold where the power stage 105 is operating in the lower band. In the case where, at decision box 210, it is determined that the measured operating parameter has passed back over the threshold, the decision maker module 20 returns control of the operating parameter to the PID control module or the PI control module 30, i.e. the decision maker module 20 switches from the second transient mode of operation to the first steady state mode of operation. The threshold can therefore be considered as a reset threshold.

If, at decision box 210, it is determined that the measured operating parameter has not passed back over the threshold, the decision maker module 20 maintains the second transient mode of operation by continuing to implement the one or more change control parameters provided by the transient compression control module 25. The second transient mode of operation is continued until such time that, at decision box 210, it is determined that the measured operating parameter has passed back over the threshold. Consequently, during the second transient mode of operation, the decision maker module 20 continuously or periodically makes a determination at decision box 205 as to whether or not the measured operating parameter has passed back over the threshold.

The foregoing arrangement of the controller 10 enables the decision maker module 30 and/or the transient compression control module 25 to operate at the switching frequency of the controller 10. This provides for a fast-dynamic response compared to prior art controllers. It is possible to achieve cycle by cycle operating parameter sharing such as voltage sharing between power stages even with very high and fixed switching frequencies as the method of the invention is computationally efficient, i.e. requires no complex mathematical calculations. Furthermore, the operating parameter can be balanced at both transient and steady state modes without limitation by the switching frequency.

FIG. 3A is a signal diagram illustrating changes in the measured operating parameter in the upper operating band of said power stage 105 when controlled according to the flow diagram of FIG. 2. The measured operating parameter is denoted by curved line 310. The upper operating band of the power stage 105 ranges from the operating parameter reference level to the upper operating limit of the power stage 105. The threshold or reset threshold may be predetermined, selected or calculated from empirical data and has, for the upper operating band, a value greater than the operating parameter reference level, but less than the upper operating limit.

In the situation depicted by FIG. 3A, the measured operating parameter is initially within the first steady state mode of operation of the power stage 105 as depicted by curve 310A. On rising above the reset threshold as depicted by curve 310B, the measured operating parameter passes the reset threshold and enters the range of the second steady state mode of operation. However, the decision maker module 20 will make a decision to switch from the first steady state mode of operation to the second transient mode of operation dependent on the selected or calculated value of the predetermined condition of the operating parameter. As such, the switch from the first steady state mode of operation to the second transient mode of operation may not occur immediately the measured operating parameter rises above the reset threshold and, in fact, is preferably triggered when the measured operating parameter level equals or just exceeds the upper operating limit. Thus, in the latter instance, the predetermined condition is set at the upper operating limit of the power stage 105.

On reaching the upper operating limit, the decision maker module 20 switches the mode of operation from the first steady state mode to the second transient mode whereby the transient compression control module 25 generates one or more change control parameters to cause said measured operating parameter of the power stage 105 to pass back over the reset threshold as depicted by line 310C in FIG. 3A. Once the measured operating parameter of the power stage 105 passes back over the reset threshold, the decision maker module 20 returns control of the measured operating parameter to the PID control module or the PI control module 30 as depicted by line 310D. Lines 310E,F,G illustrate a repetition of the foregoing control steps until the measured operating parameter is returned to the first steady state mode of operation.

Preferably, the transient compression control module 25 is configured such that the one or more change control parameters cause an increase in power to flow from a primary side to a secondary side of said DC/DC converter 100 when the measured operating parameter of the power stage 105 exhibits said predetermined operating condition. Preferably, the transient compression control module is configured to cause maximum power to flow from the primary side to the secondary side of said DC/DC converter 100 until the measured operating parameter of the power stage 105 passes back over the reset threshold.

FIG. 3B is a similar signal diagram to that of FIG. 3A, but for the measured operating parameter in the lower band of the power stage 105 when controlled according to the flow diagram of FIG. 2. The lower band ranges from the operating parameter reference level to the lower operating limit of the power stage 105. In this embodiment, the measured operating parameter is denoted by curved line 310'. The lower band reset threshold has a value less than the operating parameter reference level, but greater than the upper operating limit.

In the situation depicted by FIG. 3B, the measured operating parameter is initially within the first steady state mode of operation of the power stage 105 as depicted by curve 310'A. On decreasing below the reset threshold as depicted by curve 310'B, the measured operating parameter passes the reset threshold and enters the range of the lower band second steady state mode of operation. In this embodiment, the decision maker module 20 makes a decision to switch from the first steady state mode of operation to the second transient mode of operation when the measured operating parameter level equals or just passes below the lower operating limit. Thus, in this embodiment, the predetermined condition is set at the lower operating limit of the power stage 105.

On reaching the lower operating limit, the decision maker module 20 switches the mode of operation from the first steady state mode to the second transient mode whereby the transient compression control module 25 generates one or more change control parameters to cause said measured operating parameter of the power stage 105 to pass back over the reset threshold as depicted by line 310'C in FIG. 3B. Once the measured operating parameter of the power stage 105 passes back over the reset threshold, the decision maker module 20 returns control of the measured operating parameter to the PID control module or the PI control module 30 as depicted by line 310'D. Lines 310'E,F,G illustrate a repetition of the foregoing control steps until the measured operating parameter is returned to the first steady state mode of operation.

Preferably, the transient compression control module 25 is configured such that the one or more change control parameters cause a decrease in power to flow from the primary side to the secondary side of said DC/DC converter 100 when the measured operating parameter of the power stages 105 exhibits said predetermined operating condition. Preferably, the transient compression control module 25 is configured to cause minimum power to flow from the primary side to the secondary side of said DC/DC converter 100 until the measured operating parameter of the power stage 105 passes back over the lower band reset threshold.

Figure 3C:
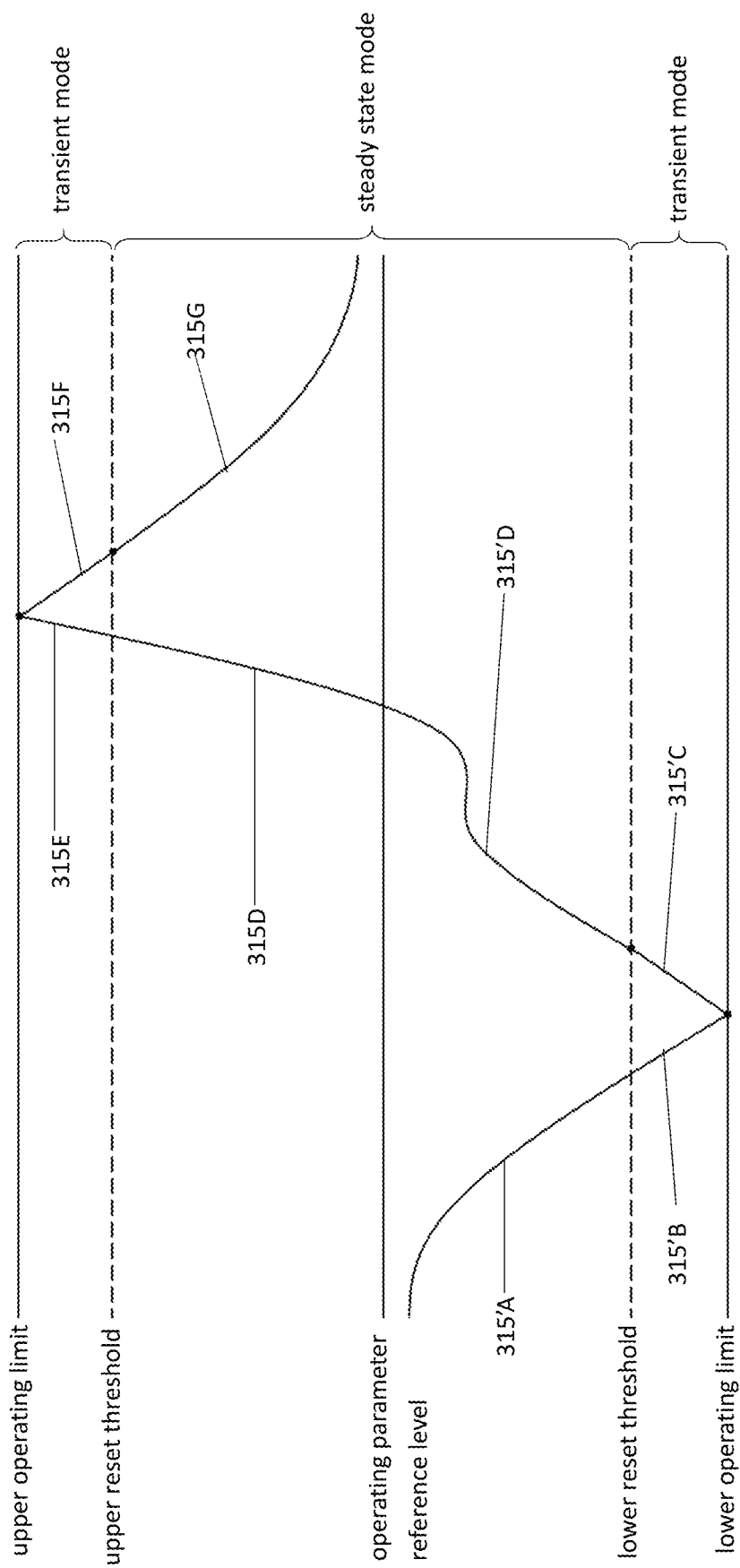
FIG. 3C is a signal diagram illustrating changes in an operating parameter of a power stage of a DC/DC converter in both an upper operating band and a lower operating band of said power stage in accordance with the invention.

FIG. 3C is a signal diagram showing the operating parameter in both the upper operating band and the lower operating band of said power stage 105 when controlled according to the flow diagram of FIG. 2.

In the situation depicted by FIG. 3C, the measured operating parameter is initially within the first steady state mode of operation in the lower band of the power stage 105 as depicted by curve 315'A. On decreasing below the lower reset threshold as depicted by curve 315'B, the measured operating parameter passes the lower reset threshold and enters the range of the second steady state mode of operation in the lower band. In this embodiment, the decision maker module 20 makes a decision to switch from the first steady state mode of operation to the second transient mode of operation for the lower band when the measured operating parameter level equals or just passes below the lower operating limit. Thus, in this embodiment, the predetermined condition for the lower band is set at the lower operating limit of the power stage 105.

On reaching the lower operating limit, the decision maker module 20 switches the mode of operation from the first steady state mode to the second transient mode whereby the transient compression control module 25 generates one or more change control parameters to cause said measured operating parameter of the power stage 105 to pass back over, i.e. rise above, the lower reset threshold as depicted by line 315'C. Once the measured operating parameter of the power stage 105 passes back over the lower reset threshold, the decision maker module 20 returns control of the measured operating parameter to the PID control module or the PI control module 30 as depicted by line 315'D.

Where the measured operating parameter rises above the operating parameter reference level, it enters the range of the steady state mode of operation in the upper band as depicted by line 315D. On rising above the upper reset threshold as depicted by curve 315E, the measured operating parameter passes the upper reset threshold and enters the range of the second steady state mode of operation in the upper band. The decision maker module 20 makes a decision to switch from the first steady state mode of operation to the second transient mode of operation when the measured operating parameter level equals or just exceeds the upper operating limit. Thus, in this embodiment, the predetermined condition for the upper band is set at the upper operating limit of the power stage 105.

On reaching the upper operating limit, the decision maker module 20 switches the mode of operation from the first steady state mode to the second transient mode whereby the transient compression control module 25 generates one or more change control parameters to cause said measured operating parameter of the power stage 105 to pass back over, i.e. fall below, the upper reset threshold as depicted by line 315F. Once the measured operating parameter of the power stage 105 passes back over the upper reset threshold, i.e. below, the decision maker module 20 returns control of the measured operating parameter to the PID control module or the PI control module 30 as depicted by line 315G.

Where the DC/DC converter 100 is of the type having a shared input voltage and a controlled output voltage, the decision maker module 20 of the controller 10 is configured to override one or both of the shared input voltage and the controlled output voltage when said transient compression control module 25 is providing said or more change control parameters.

Figure 4:
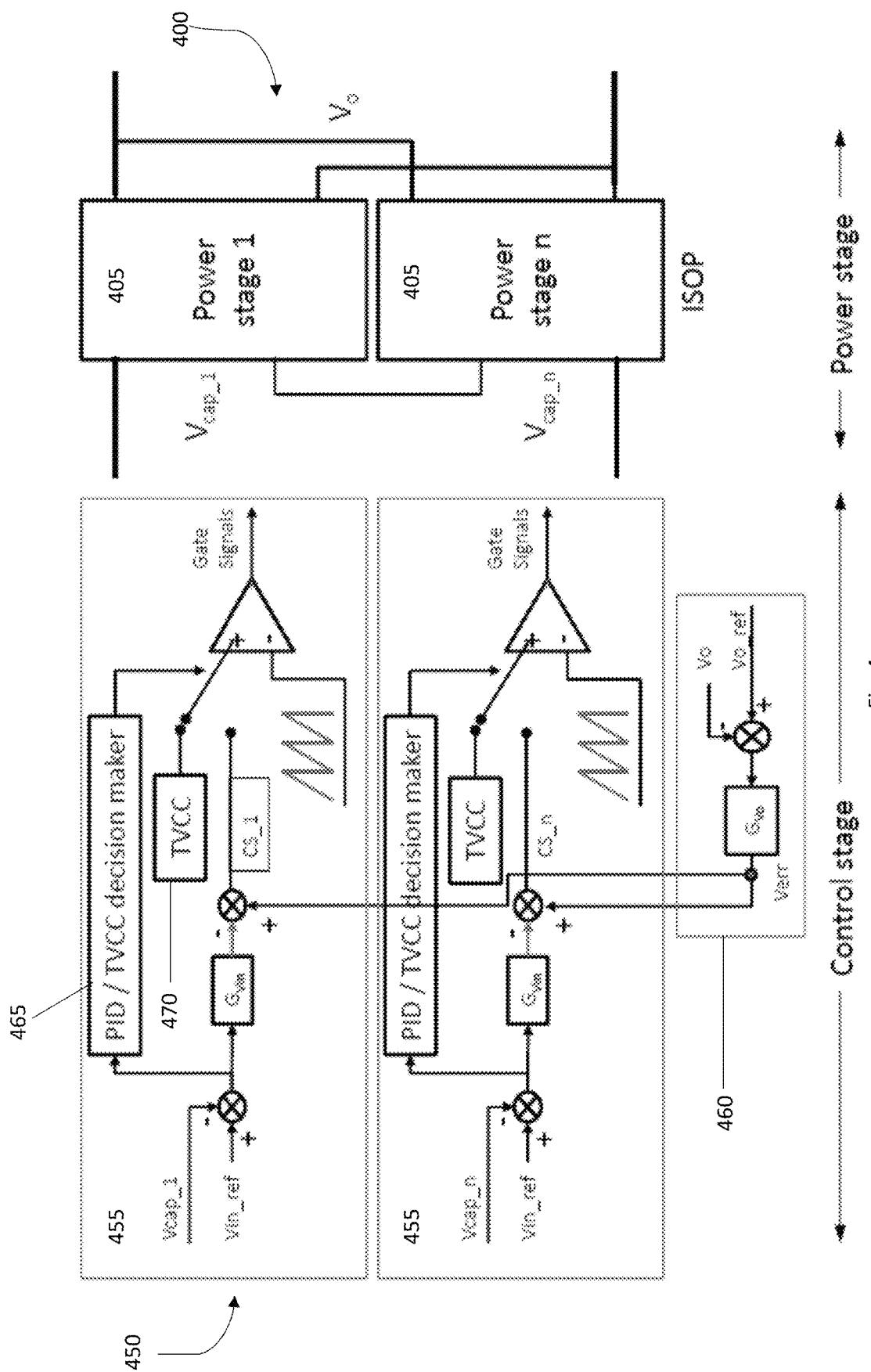
FIG. 4 is a schematic block diagram of a controller and an input-series-output-parallel (ISOP) connected DC/DC converter in which the operating parameter being controlled is the input voltage of one or more power stages of the ISOP DC/DC converter.

FIG. 4 is a schematic block diagram of another embodiment of the controller in accordance with the invention for controlling an input-series-output-parallel (ISOP) connected DC/DC converter in which the operating parameter being controlled is the input voltage ($V_{cap\_1 \ldots n}$) of one or more of the power stages of the ISOP DC/DC converter. An ISOP converter is an efficient and reliable converter for medium to high voltage applications such as traction engines and power transmission systems but is increasingly being considered for lower voltage applications for high power density and high efficiency.

The ISOP DC/DC converter 400 as shown in FIG. 4 comprises N power stages 405 and a controller 450. The controller 450 comprises N control modules 455 and a PID control module or the PI control module 460.

For steady state operation of the ISOP DC/DC converter 400, the PID control module or the PI control module 460 continuously calculates an error value between a desired output voltage level, "$V_{o\_ref}$", for at least one of the power stages 405 and a measured output voltage level, "$V_o$", of said at least one of the power stages 405 in order to apply a correction based on the PID control module's or the PI control module's control terms. The PID control module or the PI control module 460 attempts to minimize the error over time by adjusting a control variable or parameter to a new value determined by a weighted sum of the PID/PI control terms.

The controller 450 differs from a conventional controller in that each control module 455 includes a decision maker module ("PID/TVCC decision maker") 465 and a transient compression control module ("TVCC") 470, otherwise the controller 450 is of a conventional control arrangement. In this embodiment, the controller 450 is preferably configured to control the respective power stages 405 in both the upper and lower bands according to the control flow diagram of FIG. 5 and the signal diagrams of FIGS. 6A-C.

Taking the Nth power stage (power stage N) 405 by way of example, its respective control module 455 receives, as an input, a measured input voltage Vcap_n as the operating parameter. For the steady state mode of operation of the power stage 405, the PID module or the PI control module 460 provides steady state regulation in a known manner.

Figure 5:
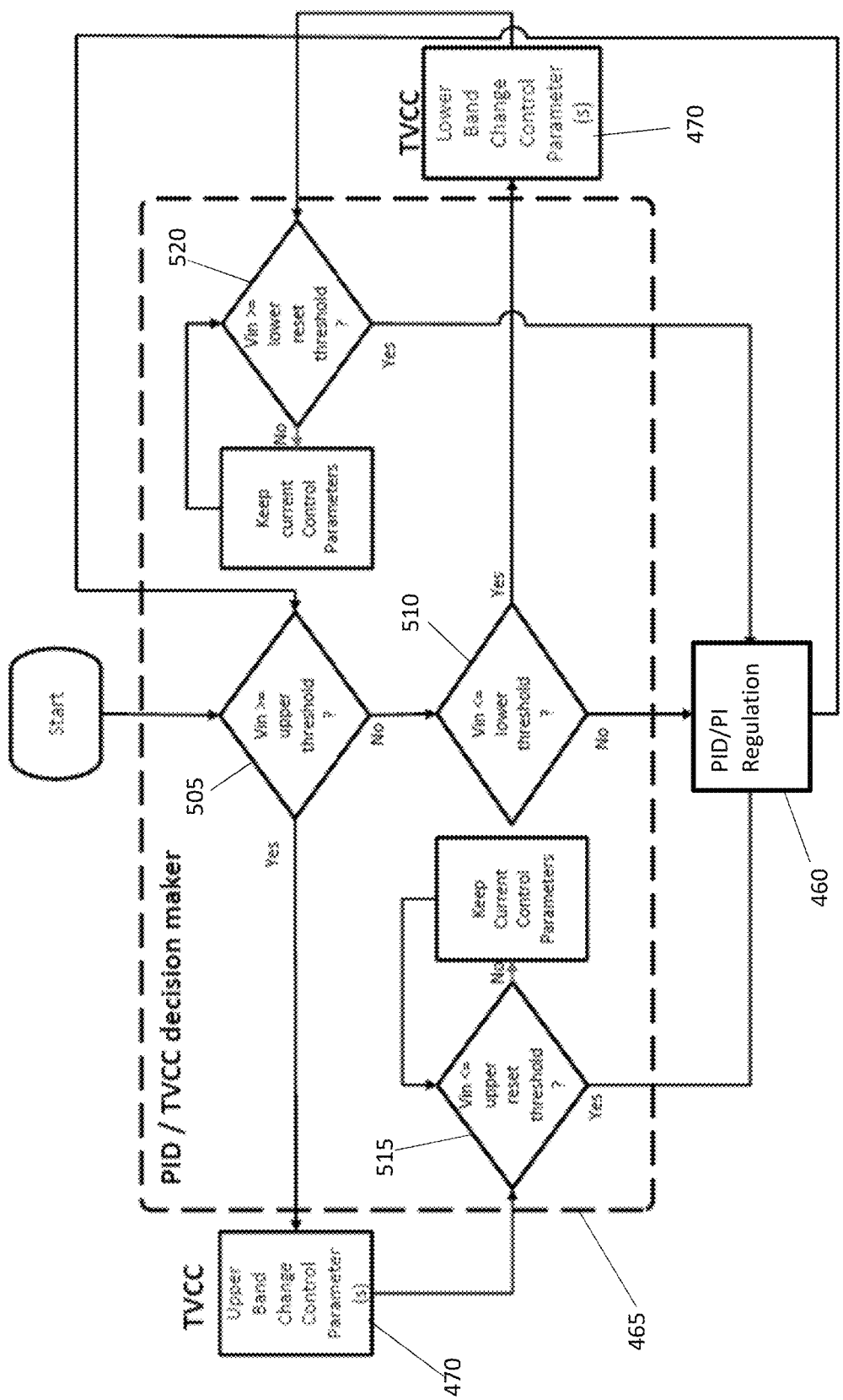
FIG. 5 is a flow diagram illustrating operation of the controller of FIG. 4 in accordance with a method of the invention.

Referring to FIG. 5, at a first decision box 505, the decision maker module 465 compares the measured input voltage, Vcap_n (also referred to as "Vin"), to an upper voltage threshold or reset threshold 1 of the upper operating band of the power stage 405. If at decision box 505, it is determined that Vin is not greater than or equal to the reset threshold 1 then, at decision box 510, the decision maker module 465 compares the measured input voltage Vin to a lower voltage threshold or reset threshold 2 of the lower operating band of the power stage 105. If at decision box 510, it is determined that Vin is not less than or equal to the reset threshold 2 then the decision maker module 465 passes control to, or maintains control by, the PID control module or the PI control module 460 which regulates the steady state mode of operation in a generally conventional manner.

If, however, at decision box 505, a determination is made that Vin is greater than or equal to reset threshold 1 then the decision maker module 465 determines that the power stage 405 is operating in the second transient mode of operation in the upper band. Consequently, the decision maker module 465 passes control of the upper operating band of the power stage 405 to the transient compression control module 470. In this embodiment, the switch by the decision maker module 465 from the first steady state mode of operation to the second transient more of operation is triggered when the measured input voltage Vin is equal or exceeds the upper operating voltage (Vub) of the power stage 405. Thus, the predetermined condition in this embodiment for triggering operation of the transient compression control module 470 in the upper operating band is the upper operating voltage limit of the power stage 405. However, it will be understood that the predetermined condition could comprise other conditions such as when the measured input voltage Vin equals or just exceeds reset threshold 1. However, it is preferred to use the predetermined condition comprising the upper operating voltage limit of the power stage 405 as this provides time for the transient compression control module 470 to bring control to the transient mode of operation whilst avoiding intermittent switching between the two modes of operation which is more likely when the predetermined condition is set at equal to or just above the level of reset threshold 1.

In response to being triggered, the transient compression control module 470 generates one or more upper band change control parameters to cause the measured input voltage Vin to decrease. At decision box 515, the decision maker module 465 determines whether or not Vin has decreased sufficiently to pass below the reset threshold 1. If yes, the decision maker module 465 passes control back to the PID module or the PI control module 460. If no, the decision maker module 465 maintains operation of the transient compression control module 470 to continue generating the one or more upper band change control parameters. The decision maker module 465 either continuously or periodically repeats the determination at decision box 515 until such time as Vin does decrease below reset threshold 1 at which point steady state control by the PID control module or the PI control module 460 recommences.

In the case where, at decision box 505, a determination is made that Vin is not greater than or equal to reset threshold 1, but, at decision box 510, a determination is made that Vin is equal to or lower than reset threshold 2, the decision maker module 465 determines that the power stage 405 is operating in the second transient mode of operation for the lower band. Consequently, the decision maker module 465 passes control of the lower operating band of the power stage 405 to the transient compression control module 470. In this embodiment, the switch by the decision maker module 465 from the first steady state mode of operation to the second transient more of operation is triggered when the measured input voltage Vin is equal or less than the lower operating voltage (Vlb) of the power stage 405. Thus, the predetermined condition in this embodiment for triggering operation of the transient compression control module 470 in the lower operating band is preferably the lower operating voltage limit of the power stage 405.

In response to being triggered, the transient compression control module 470 generates one or more lower band change control parameters to cause the measured input voltage Vin to increase. At decision box 520, the decision maker module 465 determines whether or not Vin has increased sufficiently to pass above the reset threshold 2. If yes, the decision maker module 465 passes control back to the PID module or the PI control module 460. If no, the decision maker module 465 maintains operation of the transient compression control module 470 to continue generating the one or more lower band change control parameters. The decision maker module 465 either continuously or periodically repeats the determination at decision box 520 until such time as Vin does increase above reset threshold 2 at which point steady state control by the PID control module or the PI control module 460 recommences.

It will be understood that the decision-making boxes 505 and 510 could be interchanged such that the measured operation parameter is first tested against the lower band threshold and then tested against the upper band threshold.

It will also be understood that, although the transient compression control module 470 is shown as comprising two parts in FIG. 5, it preferably comprises a single functional block or circuit.

For the upper band, the transient compression control module 470 generates one or more upper band change control parameters to cause the measured input voltage Vin to decrease. It does this by causing an increase in power to flow from a primary side to a secondary side of the ISOP DC/DC converter 400 when Vin exhibits said predetermined upper band operating condition. Preferably, for the upper band, the transient compression control module causes maximum power to flow from the primary side to the secondary side of the ISOP DC/DC converter 400.

For the lower band, the transient compression control module 470 generates one or more lower band change control parameters to cause the measured input voltage Vin to increase. It does this by causing a decrease in power to flow from a primary side to a secondary side of the ISOP DC/DC converter 400 when Vin exhibits said predetermined lower band operating condition. Preferably, for the lower band, the transient compression control module causes minimum power to flow from the primary side to the secondary side of the ISOP DC/DC converter 400.

In this and other embodiments, the reference voltage Vref (FIGS. 6A-C) preferably comprises the nominal DC link voltage in the DC/DC converter for the power stages. Vref is the reference voltage that the DC/DC converter is to be regulated to. For example, if Vref=100 v, this means that the output/input voltage of the DC/DC converter is to be regulated to 100V. In considering the component tolerance and temperature effect, the upper operating band limit is preferably set at a certain voltage (operating parameter) margin, such as 20%, of the MOSFETs and capacitors that one voltage class is higher than Vref value. The reset threshold 1 is preferably set between the upper operating band limit and Vref at a certain voltage margin, such as 20%, higher than Vref at steady state to avoid overlapping with the allowable voltage ripple and accuracy of the voltage regulation. The reset threshold 2 is preferably set between the lower operating band limit and Vref at a certain voltage margin, such as 20%, lower than the minimum power stage voltage at steady state. The lower band operating limit is preferably set at a certain voltage margin, such as 20%, lower than system input voltage divided by the number of power stages.

Where the ISOP DC/DC converter 400 comprises an LLC converter, the change control parameter preferably comprises the converter switching frequency. In the case where the ISOP DC/DC converter 400 comprises a phase shift converter, the change control parameter preferably comprises the phase shift angle. In the cases where the ISOP DC/DC converter 400 comprises either a DAB converter or a full-bridge converter, the change control parameter preferably comprises the converter's duty cycle.

In all embodiments, the decision maker module is preferably configured to manipulate the input of the DC/DC converter's pulse width modulation (PWM) generator to generate PWM signals for all switching elements to thereby implement the afore-described steps of the method of the invention. Thus, the decision maker module is configured to trigger the PWM generator generate PWM signals to implement the PID/PI control through the PID control module or the PI control module for the steady state mode of operation and, for the transient more of operation, to (i) trigger the PWM generator to generate PWM signals to maximize power flow from the primary side to the secondary side of the converter for the upper band transient mode of operation, and (ii) trigger the PWM generator to generate PWM signals to minimize power flow from the primary side to the secondary side of the converter for the lower band transient mode of operation.

Figure 6A:
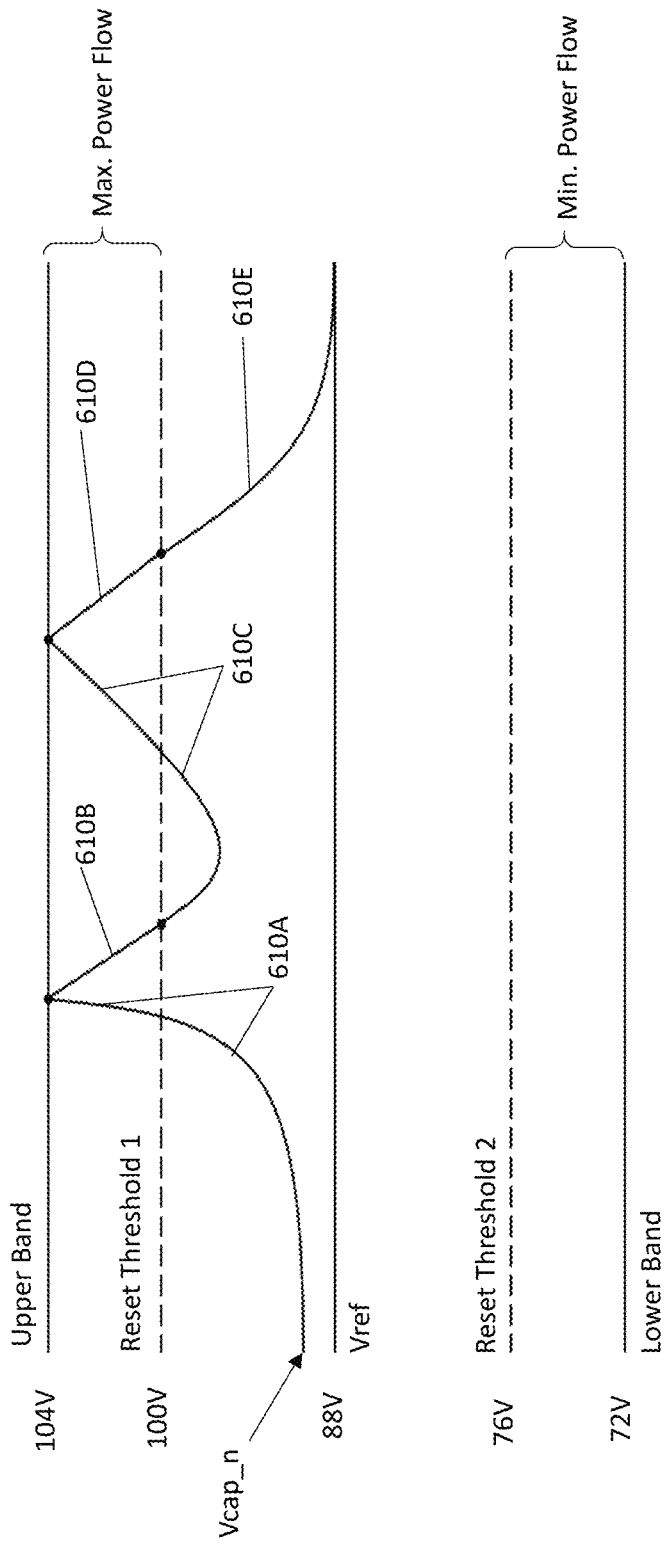
FIG. 6A is a signal diagram illustrating changes in the input voltage of a power stage of the ISOP DC/DC converter of FIG. 4 in an upper operating band of said power stage in accordance with the invention.

FIG. 6A is a signal diagram illustrating changes in the input voltage, Vcap_n (Vin), of an exemplary power stage 405 of the ISOP DC/DC converter 400 of FIG. 4 in the upper operating band controlled in accordance with the flow diagram of FIG. 5. Lines 610A, C, E represent operation of the DC/DC converter under PID/PI control whilst lines 610B, D represent operation of the DC/DC converter under the transient compression control module for upper band control.

Figure 6B:
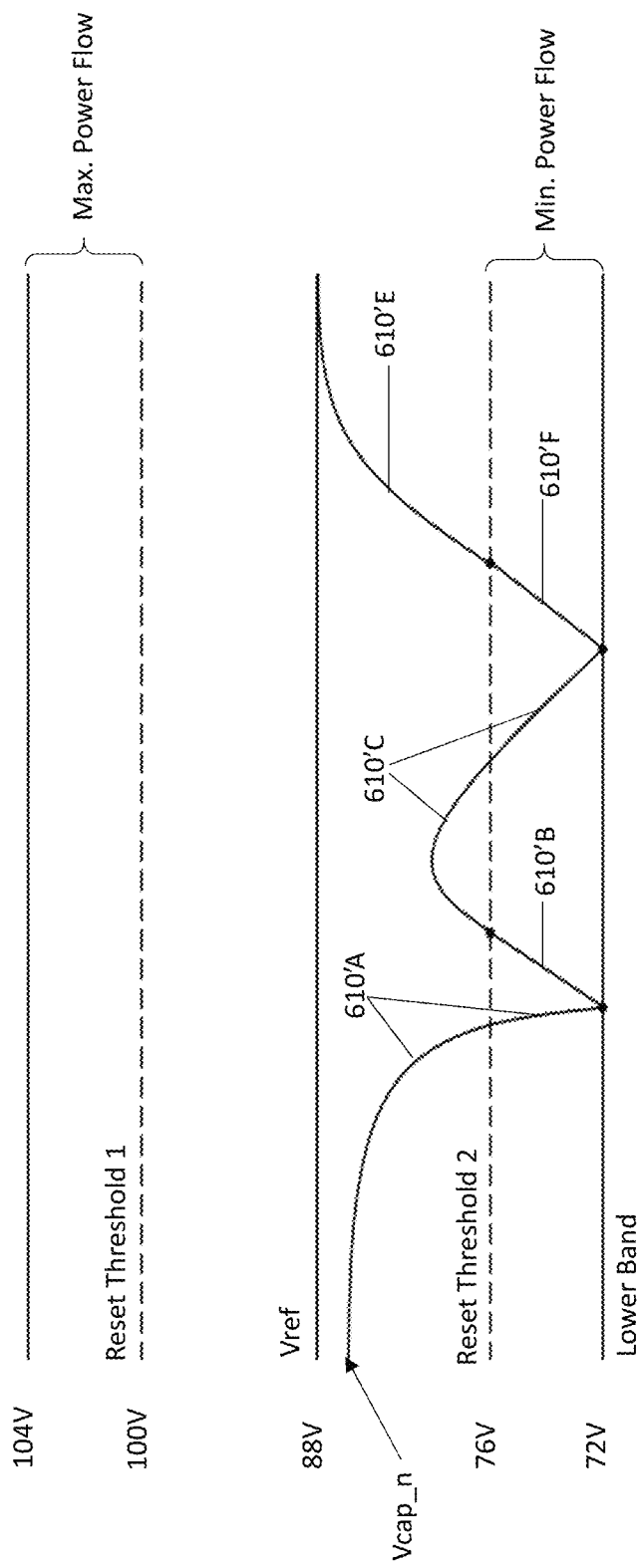
FIG. 6B is a signal diagram illustrating changes in the input voltage of the power stage of the ISOP DC/DC converter of FIG. 4 in a lower operating band of said power stage in accordance with the invention.

FIG. 6B is a signal diagram illustrating changes in the input voltage, Vcap_n (Vin), of an exemplary power stage 405 of the ISOP DC/DC converter 400 of FIG. 4 in the lower operating band controlled in accordance with the flow diagram of FIG. 5. Lines 610'A, C, E represent operation of the DC/DC converter under PID/PI control whilst lines 610'B, D represent operation of the DC/DC converter under the transient compression control module for upper band control.

Figure 6C:
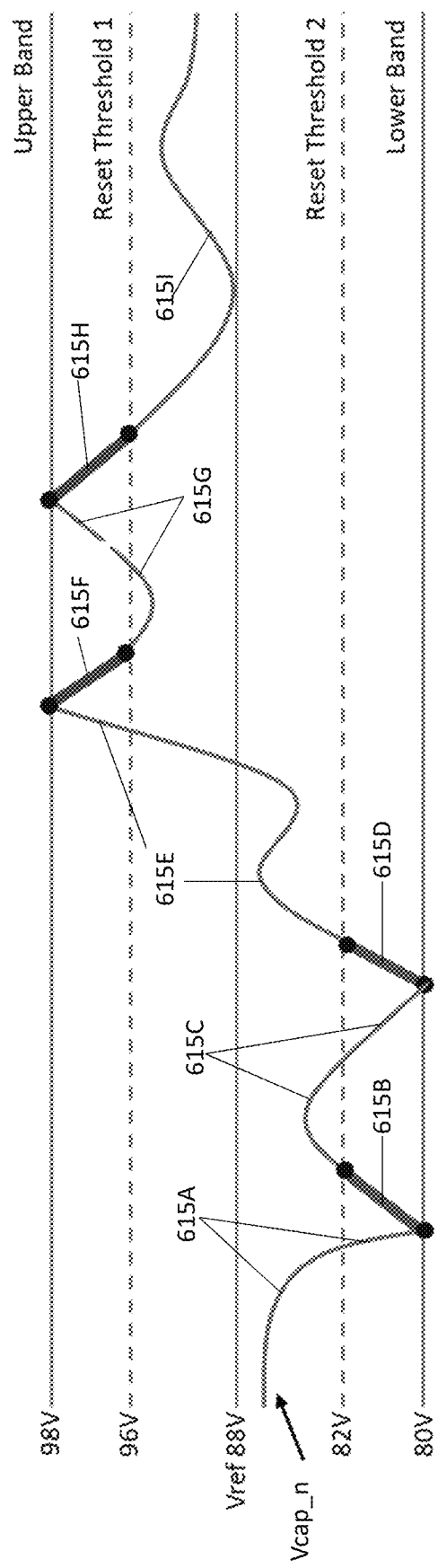
FIG. 6C is a signal diagram illustrating changes in the input voltage of the power stage of the ISOP DC/DC converter of FIG. 4 in both an upper operating band and a lower operating band of said power stage in accordance with the invention.

FIG. 6C is a signal diagram illustrating changes in the input voltage, Vcap_n (Vin), of an exemplary power stage 405 of the ISOP DC/DC converter 400 of FIG. 4 in both the upper operating band and the lower operating band controlled in accordance with the flow diagram of FIG. 5. Lines 615A,C,E,G,I represent operation of the DC/DC converter under PID/PI control whilst lines 615B,D represent operation of the DC/DC converter under the transient compression control module for lower band control and lines 615F,H represent operation of the DC/DC converter under the transient compression control module for upper band control.

The voltage levels illustrated in FIGS. 6A-C are for a targeted power stage input voltage of 88V with a load change of between 3% and 100%. Using the prior art solution taught by Xinbo Ruan, Wu Chen, Lulu Cheng, Chi K. Tse, Hong Yan, and Tao Zhang, "Control Strategy for Input-Series—Output-Parallel Converters," IEEE TRANSACTIONS ON INDUSTRIAL ELECTRONICS, VOL. 56, NO. 4, pp. 1174-1185, APRIL 2009, where, for the same targeted power stage input voltage and load changes, it is necessary to employ an e-cap rated at 200V or a MOSFET also rated at 200V, the present invention only requires an e-cap rated at most at 160V or a MOSFET also rated at most at 160V. The significance of this is the considerable reduction in cost represented by the lower rated components for the controller and DC/DC converter in accordance with the invention.

Figure 7:
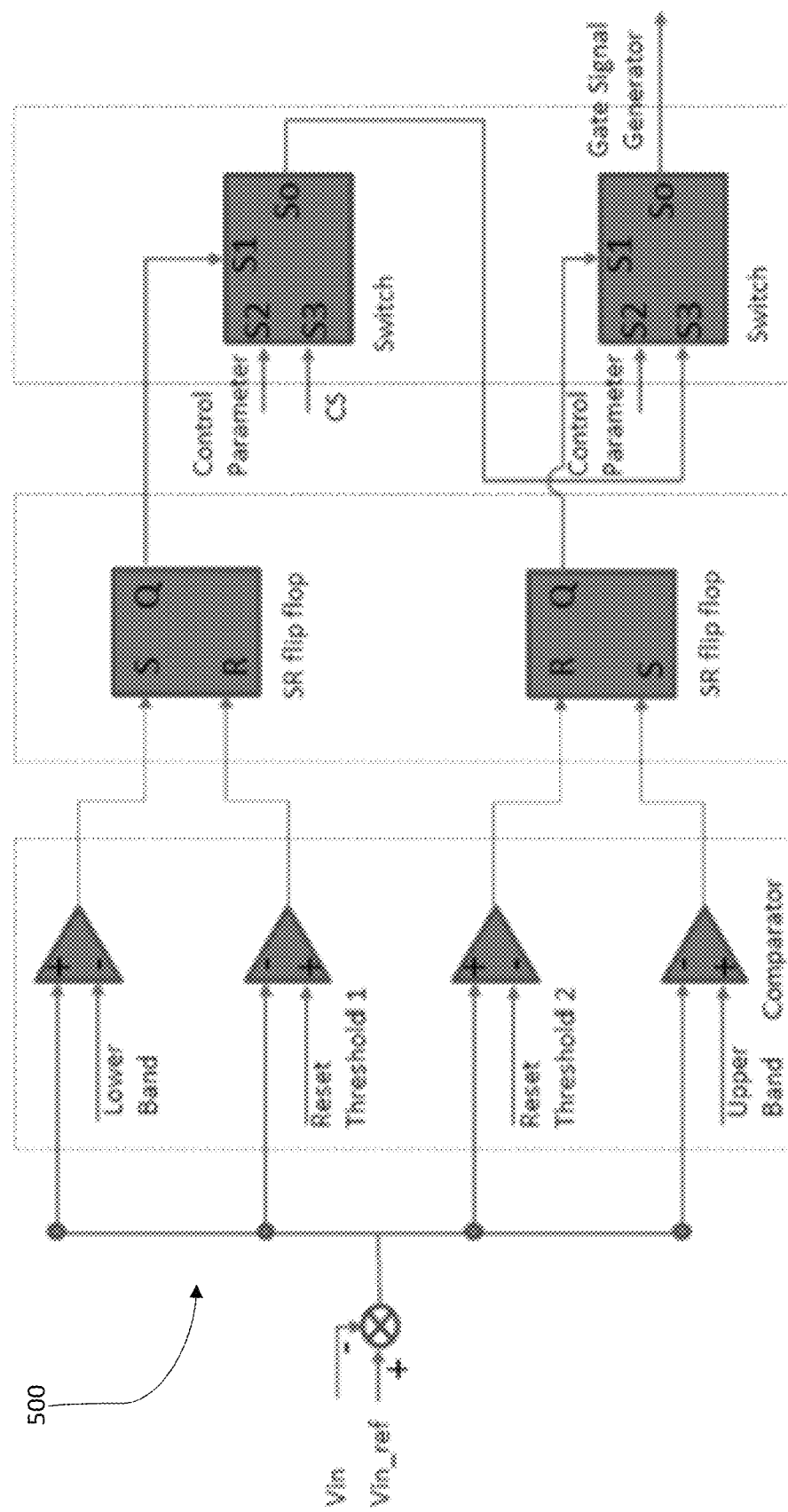
FIG. 7 is a block schematic diagram of a specific circuit implementation of a control module for the controller for the ISOP DC/DC converter of FIG. 4.

FIG. 7 is a block schematic diagram of a specific and simple analog circuit 500 implementation of a control module 455 for the controller 450 for the ISOP DC/DC converter 400 of FIG. 4. When digital coding for control of the analog circuit 500 is included, no sensing circuits and no extra components are required. The analog circuit 500, with or without digital coding, can also be used as the control module for other embodiments of the controller according to the invention.

Figure 8:
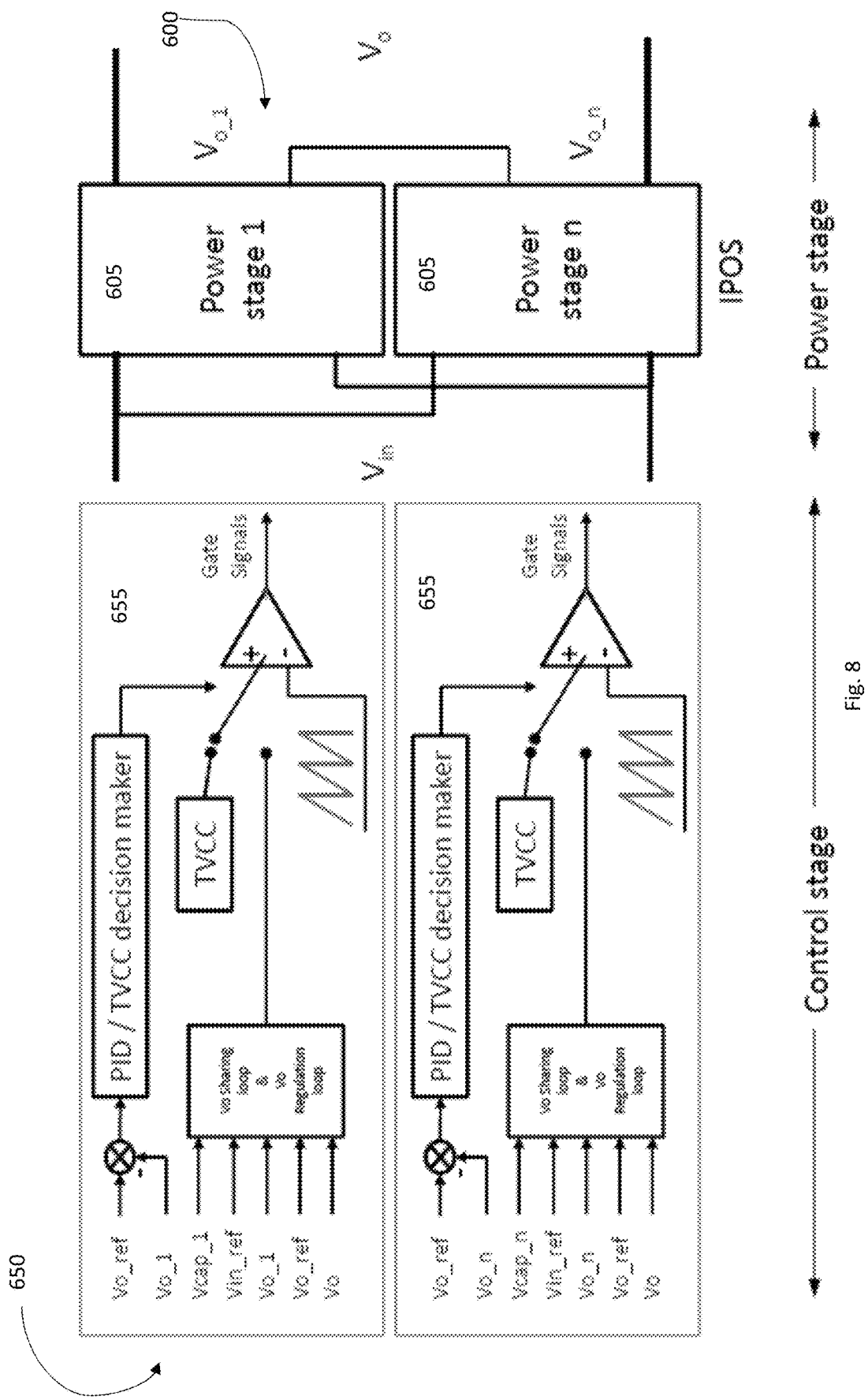
FIG. 8 is a schematic block diagram of a controller and an input-parallel-output-series (IPOS) connected DC/DC converter in which the operating parameter being controlled is the output voltage of one or more power stages of the IPOS DC/DC converter.

FIG. 8 is a schematic block diagram of another embodiment of the controller in accordance with the invention for controlling an input-parallel-output-series (IPOS) connected DC/DC converter 600 in which the operating parameter being controlled is the output voltage ($V_{o\_1\ldots n}$) of one or more of the power stages of the IPOS DC/DC converter 600. The configuration of the controller 650 of FIG. 8 is the same as that of FIG. 4 save for the fact that each control module 655 receives, as an input, a measured output voltage ($V_{o\_1\ldots n}$) of a respective one of the power stages 605 of the IPOS DC/DC converter 600 as the operating parameter. In all other respects, the controller 650 operates according to the control flow of FIG. 5 but where the measured output voltage ($V_{o\_1\ldots n}$) of each respective one of the power stages 605 is compared to an associated upper band threshold (reset threshold 1) and an associated lower band threshold (reset threshold 2).

Figure 9:
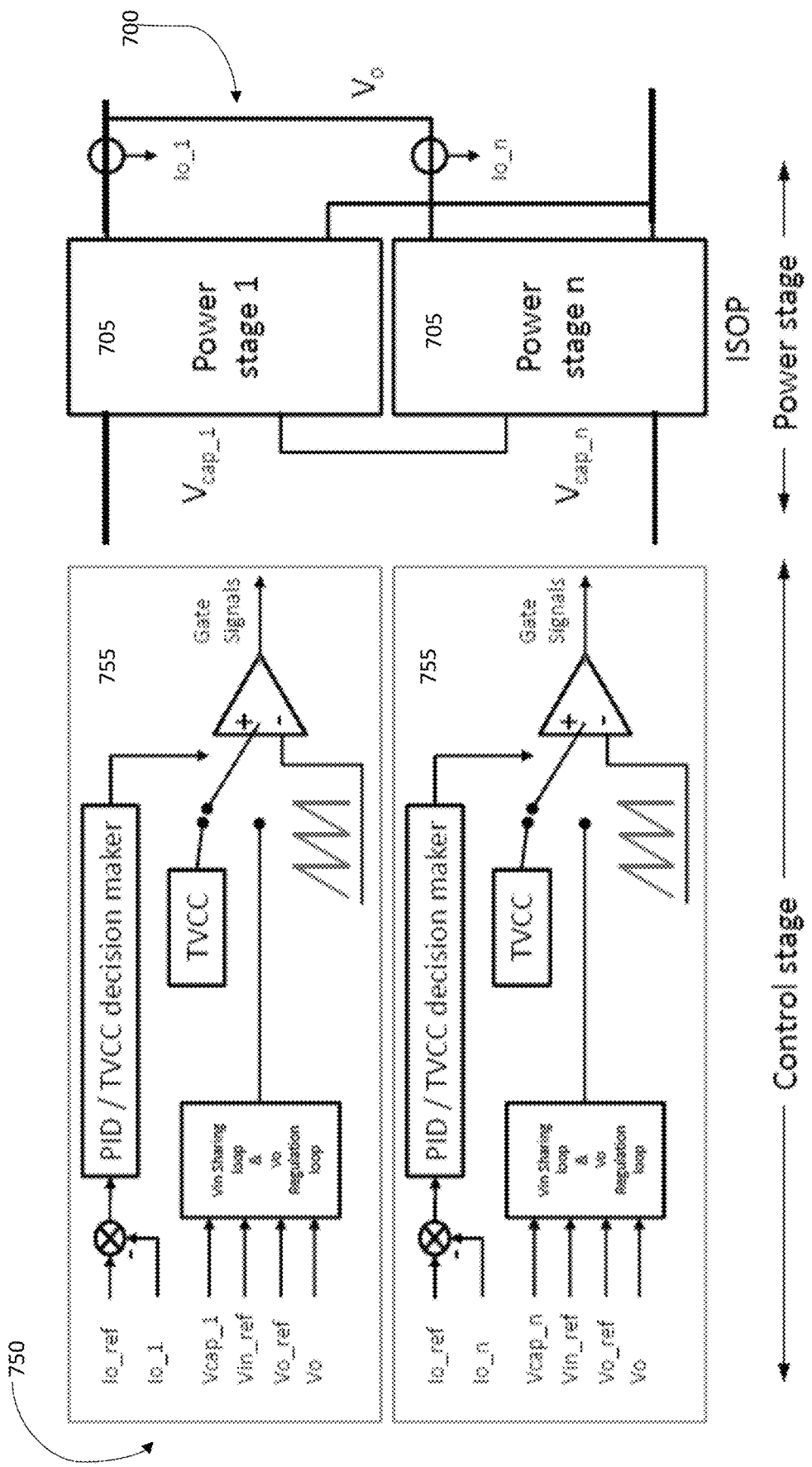
FIG. 9 is a schematic block diagram of a controller and an input-series-output-parallel (ISOP) connected DC/DC converter in which the operating parameter being controlled is the output current of one or more power stages of the ISOP DC/DC converter.

FIG. 9 is a schematic block diagram of another embodiment of the controller in accordance with the invention for controlling an ISOP connected DC/DC converter 700 in which the operating parameter being controlled is the output current ($I_{o\_1 \ldots n}$) of one or more of the power stages of the ISOP DC/DC converter 700. The configuration of the controller 750 of FIG. 9 is the same as that of FIG. 4 save for the fact that each control module 755 receives, as an input, a measured output current ($I_{o\_1 \ldots n}$) of a respective one of the power stages 705 of the ISOP DC/DC converter 700 as the operating parameter. In all other respects, the controller 750 operates according to the control flow of FIG. 5 but where the measured output current ($I_{o\_1 \ldots n}$) of each respective one of the power stages 705 is compared to an associated upper band threshold (reset threshold 1) and an associated lower band threshold (reset threshold 2).

Not shown is a further embodiment in which a controller in accordance with the invention is configured for controlling an IPOS connected DC/DC converter in which the operating parameter being controlled is the input current ($I_{i\_1 \ldots n}$) of one or more of the power stages of the IPOS DC/DC converter. The configuration of the controller is the same as that of FIG. 4 save for the fact that each control module receives, as an input, a measured input current ($I_{i\_1 \ldots n}$) of a respective one of the power stages of the IPOS DC/DC converter as the operating parameter. In all other respects, the controller operates according to the control flow of FIG. 5 but where the measured input current ($I_{i\_1 \ldots n}$) of each respective one of the power stages is compared to an associated upper band threshold (reset threshold 1) and an associated lower band threshold (reset threshold 2).

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A controller for a DC/DC converter of a type having N power stages, where N is a natural number greater or equal to 2, the controller comprising for at least one of the N power stages:

a decision maker module for determining (i) a first steady state mode of operation and (ii) a second transient mode of operation for said at least one of the N power stages, said decision maker module being configured to switch control from said first steady state mode of operation to said second transient mode of operation when an operating parameter of said at least one of the N power stages exhibits a predetermined operating condition relative to a predetermined operating limit and/or a predetermined, calculated or selected threshold; and a transient compression control module configured to be triggered when the decision maker module switches control from said first steady state mode of operation to said second transient mode of operation, said transient compression control module being configured to provide one or more change control parameters to cause said operating parameter of said at least one of the N power stages to pass back over said predetermined, calculated or selected threshold.

2. The controller of claim 1, wherein said DC/DC converter is of a type having a shared input voltage and a controlled output voltage and wherein the decision maker module is configured to override one or both of the shared input voltage and the controlled output voltage when said transient compression control module is providing said or more change control parameters.

3. The controller of claim 1, wherein said decision maker module is configured to switch control from said second transient mode of operation to said first steady state mode of operation when the transient compression control module causes said operating parameter of said at least one of the N power stages of said DC/DC converter to pass back over said predetermined, calculated or selected threshold.

4. The controller of claim 1, wherein said controller comprises a decision maker module and a transient compression control module for each of the N power stages of the DC/DC converter.

5. The controller of claim 1, wherein said operating parameter of said at least one of the N power stages comprises any one of: input voltage; output voltage; input current; and output current.

6. The controller of claim 1, wherein the controller comprises a proportional-integral-derivative (PID) or proportional-integral (PI) control module for controlling said DC/DC converter when operating in said first steady state mode of operation.

7. The controller of claim 1, wherein said transient compression control module is configured to provide one or more change control parameters to cause an increase in power to flow from a primary side to a secondary side of said DC/DC converter when said operating parameter of said at least one of the N power stages exhibits said predetermined operating condition.

8. The controller of claim 1, wherein said transient compression control module is configured to provide one or more change control parameters to cause maximum power to flow from a primary side to a secondary side of said DC/DC converter when said operating parameter of said at least one of the N power stages exhibits said predetermined operating condition.

9. The controller of claim 1, wherein said predetermined, calculated or selected threshold for said operating parameter of said at least one of the N power stages is defined by an upper reset level for said operating parameter, where said upper reset level is greater than a reference level for said operating parameter and less than an upper operating limit of said at least one of the N power stages.

10. The controller of claim 9, wherein said predetermined operating condition comprises upper operating limit of said at least one of the N power stages.

11. The controller of claim 1, wherein said transient compression control module is configured to provide one or more change control parameters to cause a decrease in power to flow from a primary side to a secondary side of said DC/DC converter when said operating parameter of said at least one of the N power stages exhibits said predetermined operating condition.

12. The controller of claim 1, wherein said transient compression control module is configured to provide one or more change control parameters to cause minimum power to flow from a primary side to a secondary side of said DC/DC converter when said operating parameter of said at least one of the N power stages exhibits said predetermined operating condition.

13. The controller of claim 1, wherein said predetermined, calculated or selected threshold for said operating parameter of said at least one of the N power stages is defined by a lower reset level for said operating parameter, where said lower reset level is less than a reference level for said operating parameter and greater than a lower operating limit of said at least one of the N power stages.

14. The controller of claim 13, wherein said predetermined operating condition comprises lower operating limit of said at least one of the N power stages.

15. The controller of claim 1, wherein the decision maker module and/or the transient compression control module operate at the switching frequency of the controller.

16. A method of controlling a DC/DC converter of a type having N power stages, where N is a natural number greater or equal to 2, the method comprising the steps of:
for at least one of the N power stages of the DC/DC converter:
determining a first steady state mode of operation and a second transient mode of operation;
switching control from said first steady state mode of operation to said second transient mode of operation when an operating parameter of said at least one of the N power stages exhibits a predetermined operating condition relative to a predetermined operating limit and/or a predetermined, calculated or selected threshold; and
providing one or more change control parameters to cause said operating parameter of said at least one of the N power stages to pass back over said predetermined, calculated or selected threshold.

17. A DC/DC converter comprising:
N power stages, where N is a natural number greater or equal to 2; and
a controller,
wherein said controller comprises for at least one of the N power stages:
a decision maker module for determining a first steady state mode of operation and a second transient mode of operation for said at least one of the N power stages, said decision maker module being configured to switch control from said first steady state mode of operation to said second transient mode of operation when an operating parameter of said at least one of the N power stages exhibits a predetermined operating condition relative to a predetermined operating limit and/or a predetermined, calculated or selected threshold; and
a transient compression control module configured to be triggered when the decision maker module switches control from said first steady state mode of operation to said second transient mode of operation, said transient compression control module being configured to provide one or more change control parameters to cause said operating parameter of said at least one of the N power stages to pass back over said predetermined, calculated or selected threshold.

18. The DC/DC converter of claim 17, wherein the DC/DC converter comprises an input-series-output-parallel (ISOP) connected DC/DC converter or an input-parallel-output-series (IPOS) connected DC/DC converter.

19. The DC/DC converter of claim 17, wherein the DC/DC converter comprises an LLC, phase-shift, dual active bridge (DAB) or full bridge DC/DC converter.

20. A controller for a DC/DC converter of a type having N power stages, where N is a natural number greater or equal to 2, the controller comprising:
a decision maker module for determining a first steady state mode of operation and a second transient mode of operation, said decision maker module being configured to switch control from said first steady state mode of operation to said second transient mode of operation when an operating parameter of one of the N power stages exhibits a predetermined operating condition relative to a predetermined operating limit and/or a predetermined, calculated or selected threshold;
a proportional-integral-derivative (PID) or proportional-integral (PI) control module for regulating the operating parameter during said first steady state mode of operation; and
a transient compression control module for limiting any overshoot or undershoot of the operating parameter during said second transient mode of operation.

21. A controller for a DC/DC converter of a type having N power stages, where N is a natural number greater or equal to 2, the controller comprising:
a decision maker module for determining a first steady state mode of operation and a second transient mode of operation, said decision maker module being configured to switch control from said first steady state mode of operation to said second transient mode of operation when an operating parameter of one of the N power stages exhibits a predetermined operating condition relative to a predetermined operating limit and/or a predetermined, calculated or selected threshold;

a proportional-integral-derivative (PID) or proportional-integral (PI) control module for regulating the operating parameter during said first steady state mode of operation; and a transient compression control module for limiting imbalances in levels of the operating parameter between the N power stages during said second transient mode of operation.

* * * * *